(12) United States Patent
Trojanowski et al.

(10) Patent No.: US 12,407,836 B2
(45) Date of Patent: Sep. 2, 2025

(54) LOSSLESS COMPRESSION FOR LOW-LATENCY VIDEO TRANSMISSION IN RESOURCE-CONSTRAINED ENCODING ENVIRONMENT

(71) Applicant: Synaptics Incorporated, San Jose, CA (US)

(72) Inventors: Karol Trojanowski, Bielsko-Biała (PL); Scott Liam Ransom, Cambridge (GB); Timothy John Borer, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 579 days.

(21) Appl. No.: 17/667,017

(22) Filed: Feb. 8, 2022

(65) Prior Publication Data
US 2023/0254493 A1    Aug. 10, 2023

(51) Int. Cl.
*H04N 19/184* (2014.01)
*H04N 19/169* (2014.01)
*H04N 19/91* (2014.01)

(52) U.S. Cl.
CPC ....... *H04N 19/184* (2014.11); *H04N 19/1887* (2014.11); *H04N 19/91* (2014.11)

(58) Field of Classification Search
None
See application file for complete search history.

(56) References Cited

U.S. PATENT DOCUMENTS

| | | | | |
|---|---|---|---|---|
| 6,124,811 A | * | 9/2000 | Acharya | H03M 7/46 341/63 |
| 6,934,420 B1 | * | 8/2005 | Hsu | H04N 19/1883 358/426.14 |
| 2003/0021485 A1 | * | 1/2003 | Raveendran | H04N 19/14 375/E7.181 |

(Continued)

FOREIGN PATENT DOCUMENTS

WO    2003005626 A1    1/2003

OTHER PUBLICATIONS

Jimenez and Perkis, "Reversible VLC for Added Error Resilience", Joint Photographic Expert Group Conference, Crowborough: JPEG Forum Ltd, GB, Mar. 3, 1999 (Mar. 3, 1999), pp. 1-11, XP017205230. (Year: 1999).*

(Continued)

*Primary Examiner* — Kaitlin A Retallick
(74) *Attorney, Agent, or Firm* — Paradice & Li LLP (57) ABSTRACT

This disclosure provides methods, devices, and systems for data compression. The present implementations more specifically relate to lossless data compression techniques that combine entropy coding with run-length encoding of zeroes. In some aspects, an encoder may obtain a sequence of integer values representing a frame of data and may iteratively scan the sequence for runs of zeros. During each iteration of the scan, the encoder may increment a count value (N) if the current integer value is equal to zero or, if the current integer value is not equal to zero, output a pattern of bits representing the current count value or the current integer value. In some implementations, the pattern of bits may include a codeword associated with an entropy encoding scheme. More specifically, the encoder may encode the current integer value as the codeword if N>0 and may encode the current count value as the codeword if N=0.

12 Claims, 7 Drawing Sheets

(56) References Cited

U.S. PATENT DOCUMENTS

2008/0279465 A1* 11/2008 Raveendran .......... H04N 19/18
                                                        375/E7.181
2013/0300591 A1* 11/2013 Marpe ................. H03M 7/4037
                                                        341/67
2015/0264362 A1   9/2015 Joshi et al.
2020/0336155 A1  10/2020 Ovsiannikov

OTHER PUBLICATIONS

European Extended Search Report from European Patent Application No. 23155124.3, dated Jun. 13, 2023, pp. 1-9.

Malvar, "Adaptive Run-Length/ Golomb-Rice Encoding of Quantized Generalized Gaussian Sources with Unknown Statistics," Data Compression Conference (DCC'06), Jan. 1, 2006 (Jan. 1, 2006), pp. 23-32, XP055168375.

Jimenez and Perkis, "Reversible VLC for Added Error Resilience", Joint Photographic Expert Group Conference, Crowborough: JPEG Forum Ltd, GB, Mar. 3, 1999 (Mar. 3, 1999), pp. 1-11, XP017205230.

* cited by examiner

LOSSLESS COMPRESSION FOR LOW-LATENCY VIDEO TRANSMISSION IN RESOURCE-CONSTRAINED ENCODING ENVIRONMENT

TECHNICAL FIELD

The present implementations relate generally to data compression, and specifically to lossless compression for low-latency video transmissions in resource-constrained encoding environments.

BACKGROUND OF RELATED ART

Data compression is a technique for encoding information into (generally) smaller units of data. As such, data compression can be used to reduce the bandwidth or overhead needed to store or transmit such information over a communications channel (such as a wired or wireless medium). For example, an encoder encodes or compresses the information into a sequence of coded bits (also referred to as a "codeword") and a decoder subsequently decodes or decompresses the codeword to recover the original information. Data compression techniques can be generally categorized as "lossy" or "lossless." Lossy data compression may result in some loss of information between the encoding and decoding of such information. In contrast, no information is lost as a result of encoding or decoding such information using lossless data compression.

Entropy encoding is a form of lossless data compression that encodes data values into codewords of varying lengths based on the probability of occurrence of each data value. For example, data values that have a higher probability of occurrence may be encoded into shorter codewords than data values that have a lower probability of occurrence. As such, entropy encoding is often used for image compression in video playback applications (where adjacent pixels, in space or time, are likely to have the same or similar values). However, existing entropy encoding techniques (such as Huffman coding and arithmetic coding) rely on complex arithmetic or high memory bandwidth. Thus, new data compression techniques may be needed to meet the low latency requirements of modern video playback applications in resource-constrained environments.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by an encoder. The method includes steps of obtaining a number (M) of integer values representing a frame of data; performing a zero-detection operation that scans the M integer values over M iterations, respectively, and indicates, during each of the M iterations, whether the scanned integer value is equal to zero; incrementing a count value (N) responsive to the zero-detection operation indicating that the scanned integer value is equal to zero; and outputting a first pattern of bits responsive to the zero-detection operation indicating that the scanned integer value is not equal to zero, the first pattern of bits representing one of the count value or the scanned integer value based on whether N is greater than zero.

Another innovative aspect of the subject matter of this disclosure can be implemented in an encoder that includes a processing system and a memory. The memory stores instructions that, when executed by the processing system, cause the encoder to obtain a number (M) of integer values representing a frame of data; perform a zero-detection operation that scans the M integer values over M iterations, respectively, and indicates, during each of the M iterations, whether the scanned integer value is equal to zero; increment a count value (N) responsive to the zero-detection operation indicating that the scanned integer value is equal to zero; and output a first pattern of bits responsive to the zero-detection operation indicating that the scanned integer value in the sequence is not equal to zero, the first pattern of bits representing one of the count value or the scanned integer value based on whether N is greater than zero.

BRIEF DESCRIPTION OF THE DRAWINGS

The present implementations are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various aspects relate generally to data compression, and more particularly, to lossless data compression techniques that combine entropy coding with run-length encoding of zeroes. In some aspects, an encoder may obtain a sequence of integer values representing a frame of data and may iteratively scan the sequence for runs of zeros. During each iteration of the scan, the encoder may increment a count value (N) if the current integer value is equal to zero or, if the current integer value is not equal to zero, output a pattern of bits representing the current count value or the current integer value. In some implementations, the pattern of bits may include a codeword associated with an entropy encoding scheme (such as exponential Golomb-Rice). More specifically, the encoder may encode the current integer value as the codeword if N>0 and may encode the current count value as the codeword if N=0. In some implementations, the encoder may append a zero-run (ZR) prefix to the beginning of the codeword if N=0. For example, the ZR prefix may signal that the following codeword represents a run of zeroes (rather than a symbol of data). In some implementations, the ZR prefix may be a single bit having a different binary value than the least-significant bit of the codeword.

Particular implementations of the subject matter described in this disclosure can be implemented to realize one or more of the following potential advantages. The data compression techniques of the present disclosure may improve the latency of video transmissions, particularly in resource-constrained environments. As described above, adjacent pixels in video frames are likely to have the same or similar values. As such, many video encoders utilize differential encoding to transmit only the differences in pixel values with each frame of data. Such differential data values are likely to be relatively small, with zero more likely to occur than any other value. Thus, by combining entropy encoding of non-zero values with run-length encoding of zeroes, aspects of the present disclosure may achieve high compression ratios for video transmissions with relatively low encoding complexity. More specifically, by adding a ZR prefix to a given codeword, aspects of the present disclosure may leverage inherent properties of existing entropy encoding techniques to signal that the codeword represents a run of zeroes. For example, all exponential Golomb-Rice codewords include a unary prefix consisting exclusively of zeroes (or ones). As such, inserting a "1" bit before the unary prefix creates an impossible codeword, which can be interpreted by a decoder as a number of consecutive zeroes.

Figure 1:
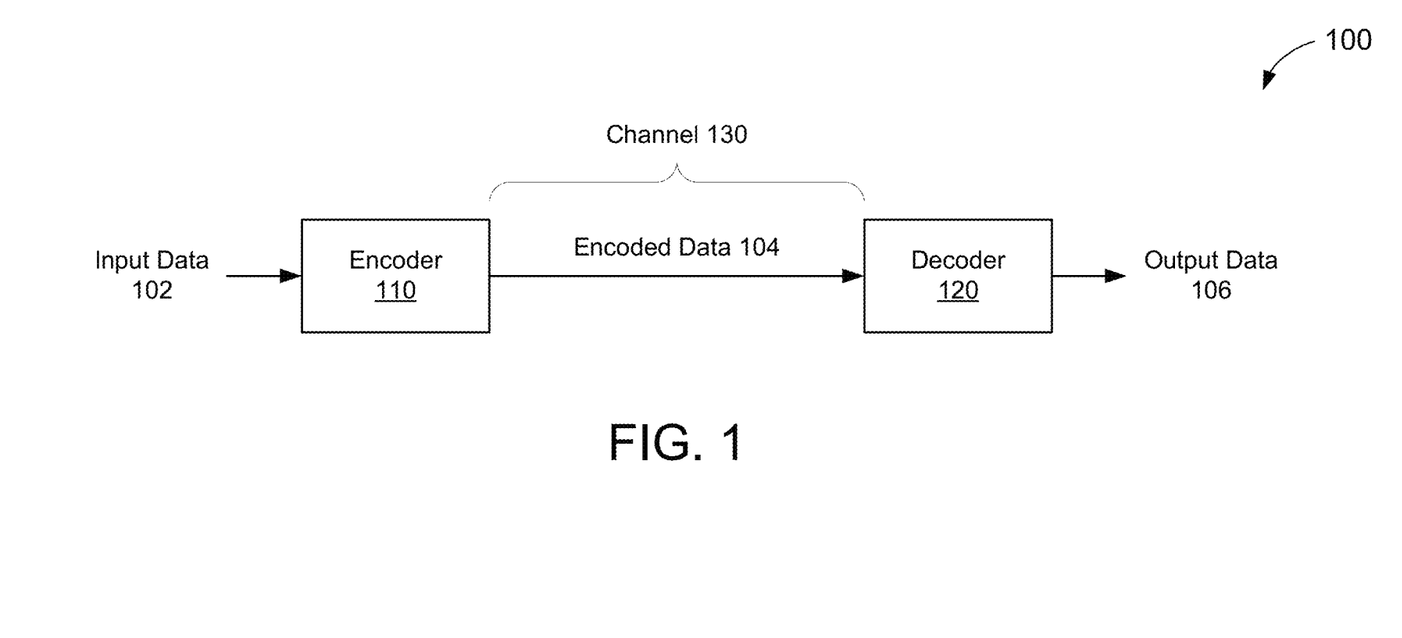
FIG. 1 shows an example communication system for encoding and decoding image data.

FIG. 1 shows an example communication system 100 for encoding and decoding image data. The communication system 100 includes an encoder 110 and a decoder 120. The encoder 110 and decoder 120 may be provided in respective communication devices such as, for example, computers, switches, routers, hubs, gateways, cameras, displays, or other devices capable of transmitting or receiving communication signals.

The encoder 110 receives input data 102 to be transmitted or stored via a channel 130. For example, the channel 130 may include a wired or wireless transmission medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104 via the channel 130 and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As such, the output data 106 may be different than the input data 102. In contrast, lossless data compression does not result in any loss of information between the encoding and decoding steps as long as the channel 130 does not introduce errors into the encoded data 104. As such, the output data 106 is identical to the input data 102. Entropy encoding is a form of lossless data compression that encodes data values into codewords of varying lengths based on the probability of occurrence of each data value. For example, data values that have a higher probability of occurrence may be encoded into shorter codewords than data values that have a lower probability of occurrence. Example entropy encoding techniques including, among other examples, arithmetic coding, Huffman coding, and Golomb coding.

Exponential Golomb-Rice (EGR) is a particular type of Golomb coding that encodes integer values into codewords of varying lengths based, at least in part, on the number (n) of bits needed to represent each integer value as a binary number. More specifically, each EGR codeword consists of a unary prefix, a delimiter, and a remainder. The unary prefix represents the least-significant bits (LSBs) of the EGR codeword and consists of n consecutive 0's (or 1's), the delimiter is a bit having a binary value equal to 1 (or 0), and the remainder represents the most-significant bits (MSBs) of the EGR codeword and consists of the n−1 LSBs of the binary number. For example, the binary number "100" (corresponding to the integer value "4") can be encoded as the EGR codeword "001000," where the unary prefix (corresponding to the three 0's to the right of the "1" bit) indicates that there are three bits in the binary number "100" and the remainder (corresponding to the two 0's to the left of the "1" bit) represents the two LSBs of the binary number "100."

Because the length of an EGR codeword depends on the number of bits associated with the binary number to be encoded, larger integer values are encoded as longer EGR codewords whereas smaller integer values are encoded as shorter EGR codewords. As such, EGR coding is well-suited for image compression in video playback applications. For example, a video source may transmit only the changes or differences in pixel values associated with successive frames of image data to be displayed or played back on a display device. This technique is referred to more generally as differential encoding. Because adjacent pixels (in space or time) are likely to have the same or similar pixel values, differential encoding of image data results in a relatively normal (or Gaussian) distribution of data values centered around zero. In other words, smaller data values (closer to zero) have a higher probability of occurring than larger data values. Thus, EGR coding may achieve a high compression ratio when used to encode differential image data.

Figure 2:
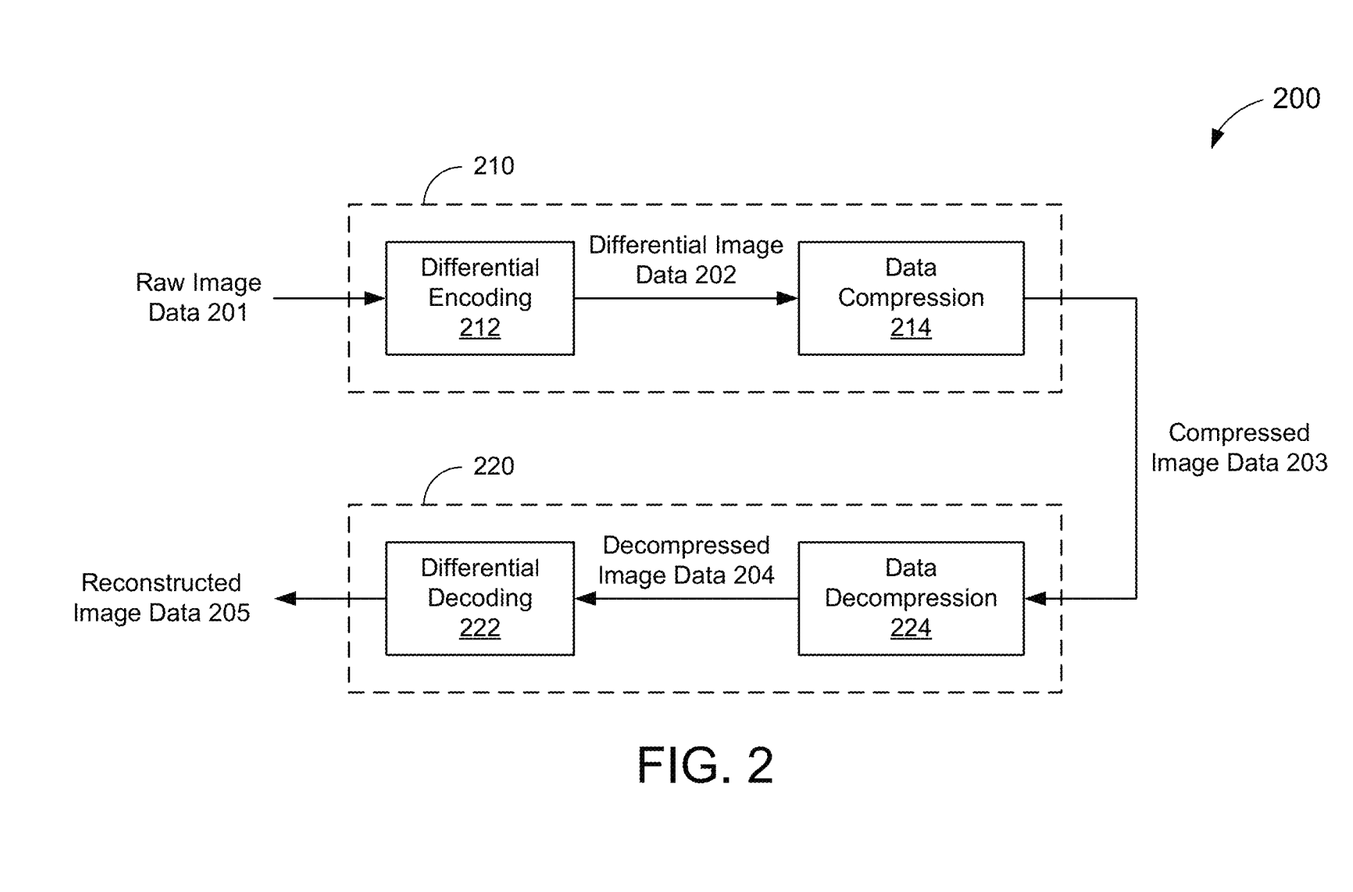
FIG. 2 shows a block diagram of a video transmission system, according to some implementations.

FIG. 2 shows a block diagram of a video transmission system 200, according to some implementations. The video transmission system 200 includes an image encoder 210 and an image decoder 220. In some implementations, the image encoder 210 and image decoder 220 may be examples of the encoder 110 and decoder 120, respectively, of FIG. 1. Thus, the image encoder 210 may be communicatively coupled to the image decoder 220 via a channel (such as the channel 130 of FIG. 1).

The image encoder 210 is configured to encode raw image data 201 for transmission, as compressed image data 203, to the decoder 220. For example, the raw image data 201 may include an array of pixels (or pixel values) representing a digital image captured or acquired by an image source (such as a camera or other image output device). The image decoder 220 is configured to decode the compressed image data 203 for display or playback, as reconstructed image data 205, on a display device (such as a television, computer monitor, smartphone, or any other device that includes an electronic display). More specifically, the image decoder 220 is configured to reverse the encoding performed by the image encoder 210 so that the reconstructed image data 205 is substantially similar, if not identical, to the raw image data 201. In some implementations, the image encoder 210 may be configured to transmit to the image decoder 220 a sequence of frames of compressed image data 203 each representing a respective image or frame of video.

In some implementations, the image encoder 210 may include a differential encoding component 212 and a data compression component 214. The differential encoding component 212 is configured to encode each frame of raw image data 201 as a respective frame of differential image data 202. For example, the differential encoding component 212 may calculate a predicted value ($\tilde{x}$) associated with each pixel value (x) in a frame of raw image data 201 and may output only the difference (d) between the predicted value $\tilde{x}$ and the actual pixel value x (where $d=\tilde{x}-x$). More specifically, the differential encoding component 212 may assume that the raw image data 201 remains relatively unchanged across successive frames of video or follows a known pattern or statistical variation. As a result, the predicted values $\tilde{x}$ may be very close, if not identical, to the actual pixel values x (and thus, the differences d may be very small and often equal to zero).

The data compression component 214 is configured to compress the differential image data 202 to further reduce the size of data transmissions from the image encoder 210 to the image decoder 220. In some aspects, the data compression component 214 may encode each difference value d associated with the differential image data 202 as a variable-length codeword in accordance with an entropy encoding technique. In some implementations, the data compression component 214 may include an EGR encoder configured to output EGR codewords based, at least in part, on the differential image data 202. As described above, the length of an EGR codeword depends on the size of the input value to be encoded, such that larger input values are encoded as longer EGR codewords and smaller input values are encoded as shorter EGR codewords. Because the difference values d are likely to be small, the data compression component 214 may achieve a relatively high compression ratio by performing EGR coding on the differential image data 202.

Aspects of the present disclosure recognize that the differential image data 202 often includes long runs of zeroes. As such, the compression ratio associated with the data compression component 214 can be further increased by encoding runs of zeroes in the differential image data 202 (such as with run-length encoding) rather than encoding each zero value individually. In some aspects, the data compression component 214 may be configured to encode each run of one or more zeroes in the differential image data 202 as an EGR codeword representing the number of consecutive zeroes and may encode each non-zero value in the differential image data 202 as an EGR codeword representing the non-zero value. For example, if the differential image data 202 includes a run of 5 consecutive zeros, the data compression component 214 may encode the run of 5 zeroes as a single EGR codeword rather than 5 EGR codewords (each representing a value equal to zero).

In some implementations, the data compression component 214 may add a zero-run (ZR) prefix to each EGR codeword representing a run of zeroes (also referred to herein as "zero-run codewords") to differentiate such EGR codewords from other EGR codewords that represent non-zero values (also referred to herein as "non-zero codewords"). Aspects of the present disclosure recognize that all non-zero codewords include a unary prefix consisting of one or more bits having the same binary value. As such, the LSB of each non-zero codeword has the same value (either 0 or 1, depending on implementation). In some implementations, the ZR prefix may be set to a value that is different than the LSB of any non-zero codeword. For example, if each non-zero codeword has its LSB set to 0, the ZR prefix appended to each zero-run codeword is set to 1. Conversely, if each non-zero codeword has its LSB set to 1, the ZR prefix appended to each zero-run codeword is set to 0.

In some implementations, the image decoder 220 may include a differential decoding component 222 and a data decompression component 224. The data decompression component 224 is configured to decode the compressed image data 203 as decompressed image data 204. More specifically, the data decompression component 224 may reverse the compression performed by the data compression component 214. In some implementations, the data decompression component 224 may be configured to distinguish between zero-run codewords and non-zero codewords based, at least in part, on the presence or absence of a ZR prefix. For example, the data decompression component 224 may identify and decode non-zero codewords in the compressed image data 203 in accordance with existing EGR decoding techniques. However, if an EGR codeword is preceded by a ZR prefix, the data decompression component 224 may interpret the decoded value of that EGR codeword to indicate a number of consecutive zeroes.

The differential decoding component 222 is configured to recover the reconstructed image data 205 from the decompressed image data 204. More specifically, the differential decoding component 222 may reverse the encoding performed by the differential encoding component 212. For example, the differential decoding component 222 may calculate a series of predicted values x̃ using the same prediction loop or algorithm as implemented by the differential encoding component 212. In some implementations, the decompressed image data 204 may include a series of recovered difference values (d̂) that are substantially similar, if not identical, to the difference values d associated with the differential image data 202. Accordingly, the differential decoding component 222 may add the recovered difference values d̂ to the series of predicted values x̃ to obtain a series of reconstructed values x, respectively, representing the reconstructed image data 205.

As described above, the data compression component 214 and the data decompression component 224 exploit an intrinsic property associated with certain types of entropy codes (such as those with a unary prefix) to signal whether a given codeword represents an integer value or a run of zeroes. In the example of FIG. 2, the encoding techniques are described specifically with respect to EGR codes. However, aspects of the present disclosure also may be implemented with respect to other encoding techniques. For example, a ZR prefix may be added to any codeword having a unary prefix (where the binary value of the ZR prefix is different than the binary value of the LSB of the codeword) to signal that the decoded value of the codeword represents a run of zeroes rather than a particular integer value.

Figure 3:
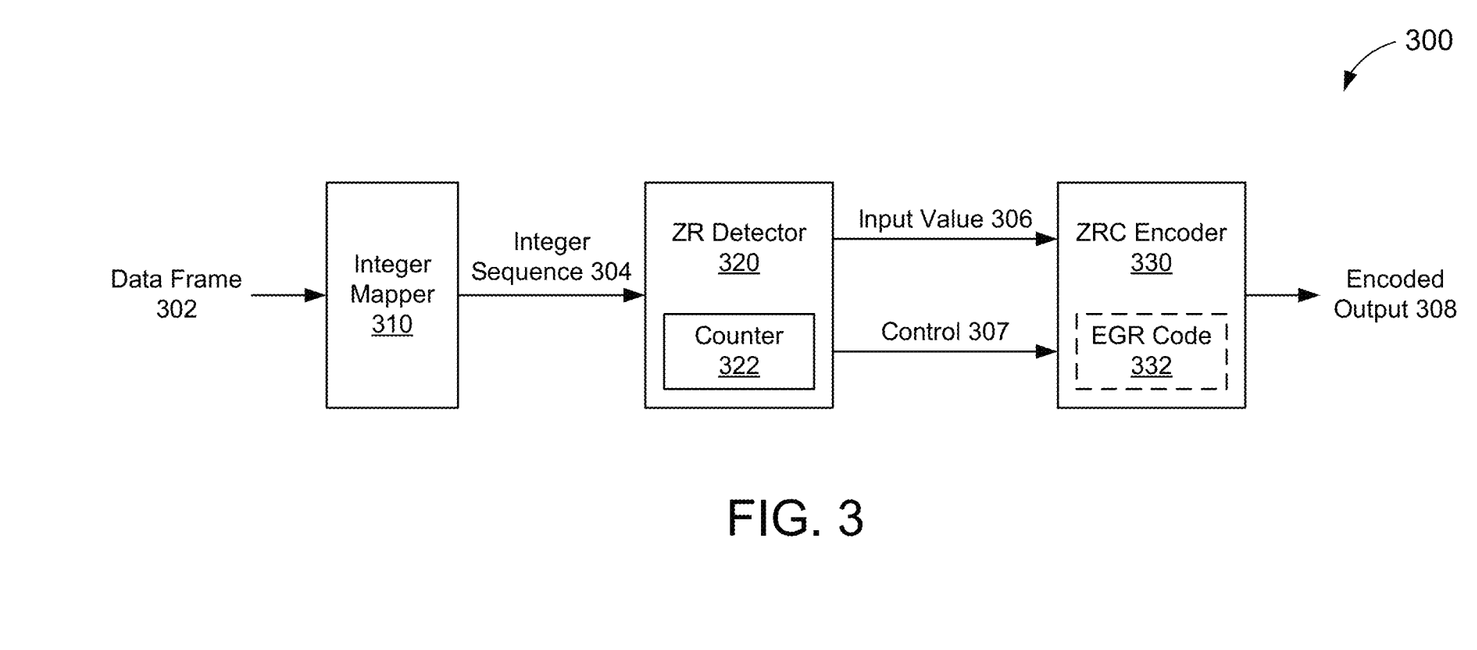
FIG. 3 shows a block diagram of a variable-length encoder, according to some implementations.

FIG. 3 shows a block diagram of a variable-length encoder 300, according to some implementations. In some implementations, the variable-length encoder 300 may be one example of the data compression component 214 of FIG. 2. More specifically, the encoder 300 may be configured to receive a frame of data 302 and produce an encoded output 308 for transmission or storage via a channel (such as the channel 130 of FIG. 1).

In some implementations, the variable-length encoder 300 may include an integer mapper 310, a zero-run (ZR) detector 320, and a zero-run compression (ZRC) encoder 330. The integer mapper 310 is configured to map the data frame to a sequence of integer values 304 having a probability distribution concentrated around zero. For example, the data frame 302 may include a number (M) of data symbols having positive or negative values. In some aspects, the integer sequence 304 may have a probability distribution concentrated around zero. In other words, more commonly-occurring data symbols are mapped to smaller integer values and less commonly-occurring data symbols are mapped to larger integer values, with the most commonly-occurring data symbol being mapped to zero. In some implementations, the integer mapper 310 may map each of the M data symbols to a non-negative (or unsigned) integer value. In some other implementations, the integer mapper 310 may map each of the M data symbols to a signed integer value.

The ZR detector 320 is configured to scan the integer sequence 304 for runs of consecutive zeroes. In some implementations, the ZR detector 320 may iteratively scan the integer sequence 304 (such as from the MSB to the LSB) so that a different integer value is scanned during each iteration. During each iteration of the scan, the ZR detector 320 may determine whether the current (scanned) integer value is equal to zero. If the current integer value is equal to zero, the ZR detector 320 may increment a counter 322 and proceed to scan the next integer value in the integer sequence 304. As such, the counter 322 maintains a count value (N) indicating the number of consecutive zeroes scanned by the ZR detector 320. If the current integer value is not equal to zero, the ZR detector 320 may provide an input value 306 to the ZRC encoder 330 based, at least in part, on the current value N associated with the counter 322.

In some implementations, the ZR detector 320 may output the current (non-zero) integer value in the integer sequence 304 or a value associated with the counter 322 as the input value 306. More specifically, the ZR detector 320 may output the current integer value in the integer sequence 304 if the current count value N is equal to zero. For example, if the current integer value is equal to 5, the ZR detector 320 may output "5" as the input value 306. On the other hand, if the current count value N is greater than zero, the ZR detector 320 may output a value equal to N−1 as the input value 306. For example, if the current count value N is equal to 5, the ZR detector 320 may output "4" as the input value 306. After outputting N−1 as the input value 306, the ZR detector 320 may reset the counter 322 (to N=0) and subsequently output the current integer value in the integer sequence 304 (as the following input value 306) before proceeding to the next iteration of the scan.

In some aspects, the ZR detector 320 may further provide a control signal 307 to the ZRC encoder 330. In some implementations, the control signal 307 may indicate whether the input value 306 represents a run of zeroes or a non-zero integer value. For example, the ZR detector 320 may drive the control signal 307 to a first state (indicating a non-zero integer value) when outputting the current integer value in the integer sequence 304 as the input value 306 and may drive the control signal 307 to a second state (indicating a run of zeroes) when outputting N−1 as the input value 306. In some other implementations, the control signal 307 may indicate whether the ZR detector 320 has scanned all M integer values in the integer sequence 304. For example, after completing the $N^{th}$ iteration of the scan, the ZR detector 320 may drive the control signal 307 to a third state (indicating that all M integer values in the integer sequence 304 have been scanned).

The ZRC encoder 330 is configured to generate an encoded output based on the input value 306, the control signal 307, or a combination thereof. In some implementations, the ZRC encoder 330 may encode the input value 306 as a non-zero codeword responsive to the control signal 307 indicating that the input value 306 represents a non-zero integer value. For example, the ZRC encoder 330 may encode the input value 306 in accordance with an EGR code 332. In some other implementations, the ZRC encoder 330 may encode the input value 306 as a zero-run codeword responsive to the control signal 307 indicating that the input value 306 represents a run of zeroes. For example, the ZRC encoder 330 may encode the input value 306 in accordance with the EGR code 332 and may further append a ZR prefix to the resulting EGR codeword (such as described with reference to FIG. 2).

Still further, in some implementations, the ZRC encoder 330 may output a stop code (as the encoded output 308) responsive to the control signal 307 indicating that all M integer values in the integer sequence 304 have been scanned. For example, the stop code may include a unique sequence of bits that cannot be decoded as a non-zero codeword or as a zero-run codeword. In other words, the stop code may be different than any non-zero codeword or zero-run codeword that can be output by the ZRC encoder 330. In some implementations, the stop code may consist of three consecutive bits each having a binary value equal to 1 (such as "111").

Figure 4:
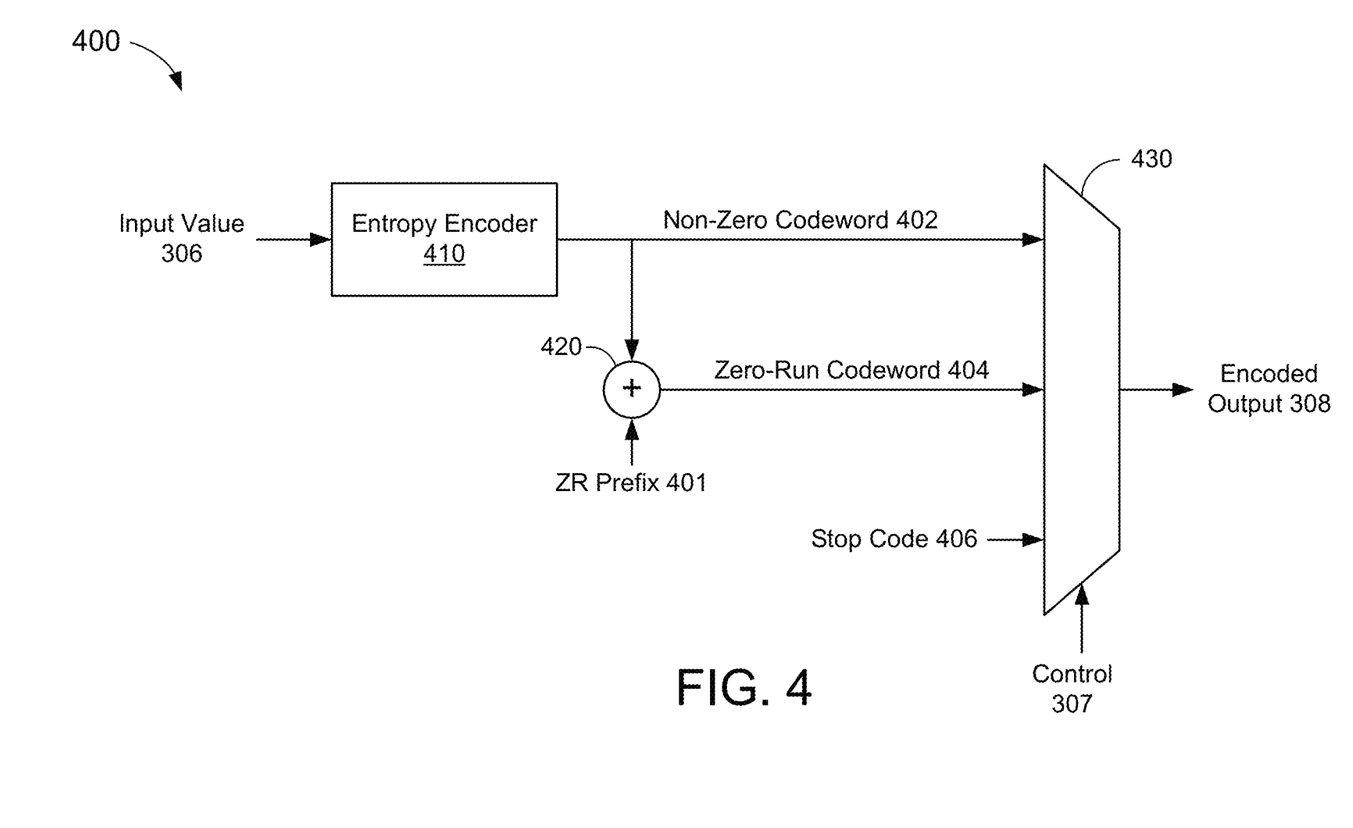
FIG. 4 shows an example zero-run compression encoder, according to some implementations.

FIG. 4 shows an example zero-run compression (ZRC) encoder 400, according to some implementations. In some implementations, the ZRC encoder 400 may be one example of the ZRC encoder 330 of FIG. 3. More specifically, the ZRC encoder 400 represents a logical implementation of the ZRC encoder 330 of FIG. 3. In the example of FIG. 4, the ZRC encoder 400 is shown to include an entropy encoder 410, a ZR prefix adder 420, and an output selector (or multiplexer) 430.

The entropy encoder 410 is configured to receive the input value 306 from the ZR detector 320 of FIG. 3 and output a non-zero codeword 402 based on the input value 306. In some implementations, the entropy encoder 410 may encode the input value 306 in accordance with an entropy encoding scheme. For example, the entropy encoding scheme maybe an EGR code. As such, the non-zero codeword 402 may be an EGR codeword having a unary prefix consisting of 0's (or 1's). The ZR prefix adder 420 is configured to append a ZR prefix 401 to the encoded integer value 402 to produce a zero-run codeword 404. More specifically, the ZR prefix 401 may represent the LSB(s) of the zero-run codeword 404. In some implementations, the ZR prefix 401 may include one or more bits having a binary value that is different than the binary value associated with each bit of the unary prefix. For example, if each bit of the unary prefix is set to 0, the ZR prefix 401 may include one or more bits that are each set to 1.

The output selector 430 is configured to select one of the non-zero codeword 402, the zero-run codeword 404, or a stop code 406 for output as the encoded output 308. As described with reference to FIG. 3, the stop code 406 may be a string of bits that cannot be interpreted as a non-zero codeword 402 or a zero-run codeword 404. In some implementations, the output selector 430 may select the encoded output 308 based on the state of the control signal 307. For example, the output selector 430 may output the non-zero codeword 402 if the control signal 307 is driven to a first state (indicating that the input value 306 represents a non-zero integer value), may output the zero-run codeword 404 if the control signal 307 is driven to a second state (indicating that the input value 306 represents a run of zeroes), and may output the stop code 406 if the control signal 307 is driven to a third state (indicating that all M integer values in the integer sequence 304 have been scanned).

Figure 5:
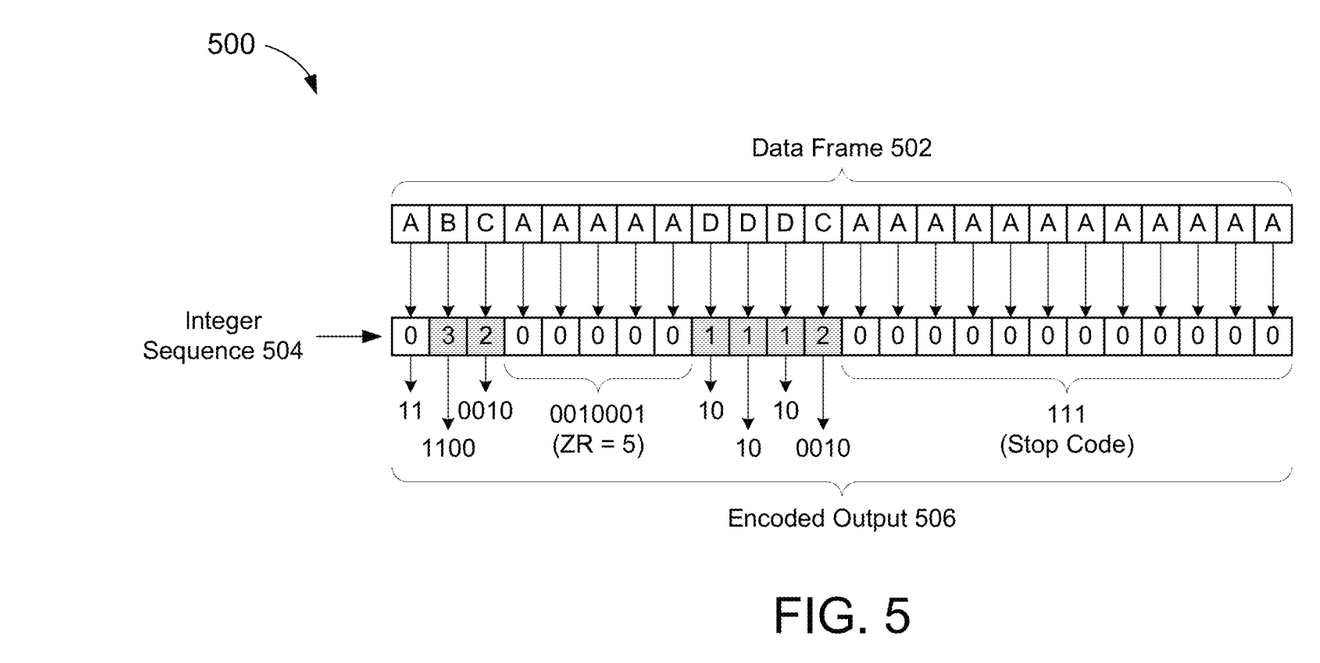
FIG. 5 shows an example encoding of differential image data, according to some implementations.

FIG. 5 shows an example process 500 for encoding data, according to some implementations. In some implementations, the encoding process 500 may be performed by the variable-length encoder 300 of FIG. 3. For example, the encoder 300 may receive a data frame 502 and may produce an encoded output 506 based on the received data frame.

In the example of FIG. 5, the data frame 502 is shown to include a sequence of 24 data symbols "ABCAAAAADDD-CAAAAAAAAAAAA." In some implementations, each data symbol may represent a pixel value or a pixel differential (representing a difference between a pixel value and a reference signal) associated with a respective pixel of an image or video frame. With reference for example to FIG. 3, the integer mapper 310 may map the 24 data symbols to 24 integer values, respectively, in an integer sequence 504. As shown in FIG. 5, the values associated with the integer sequence 504 follow a normal probability distribution concentrated around zero. That is, the integer value 0 has the highest probability of occurring, the integer value 1 has the second-highest probability of occurring, the integer value 2 has the third-highest probability of occurring, and this trend may continue on for any range of integer values.

Accordingly, the integer mapper 310 maps the most commonly-occurring value ("A") associated with the data frame 502 to the integer value 0, maps the second-most commonly-occurring data symbol ("D") associated with the data frame 502 to the integer value 1, maps the third-most commonly-occurring data symbol ("C") associated with the data frame 502 to the integer value 2, and maps the fourth-most commonly-occurring data symbol ("B") associated with the data frame 502 to the integer value 3. As a result of the mapping, the integer sequence 504 includes a sequence of 24 integer values "032000001112000000000000."

With reference for example to FIG. 3, the ZR detector 320 may iteratively scan the integer sequence 504 (such as from MSB to LSB) for runs of zeroes. During the $1^{st}$ iteration of the scan, the ZR detector 320 detects that the current integer value is 0 to zero and, in response thereto, increments the counter 320 (so that N=1). During the $2^{nd}$ iteration of the scan, the ZR detector 320 detects that the current integer value is equal to 3 and, in response thereto, outputs an input value 306 equal to 0 (representing N−1) while driving the control signal 307 to the second state (indicating a run of zeroes). Thereafter, the ZR detector 320 may reset the counter 322 (to N=0). The ZRC encoder 330 encodes the input value 306 as the EGR codeword "1" and appends a ZR prefix ("1") to the EGR codeword responsive to the control signal 307 being driven to the second state. As a result, "11" is the first codeword associated with the encoded output 506.

The ZR detector 320 further outputs an input value 306 equal to 3 (representing the current non-zero integer value) while driving the control signal 307 to the first state (indicating a non-zero integer value). The ZRC encoder 330 encodes the input value 306 as the EGR codeword "1100" but does not add the ZR prefix since the control signal 307 is in the first state. As a result, "1100" is the second codeword associated with the encoded output 506. During the 3rd iteration of the scan, the ZR detector 320 detects that the current integer value is equal to 2. Because the current count value N is equal to zero, the ZR detector 320 outputs an integer value 306 equal to 2 (representing the current non-zero integer value) while driving the control signal 307 to the first state. The ZRC encoder 330 encodes the input value 306 as the EGR codeword "0010" but does not add the ZR prefix since the control signal 307 is in the first state. As a result, "0010" is the third codeword associated with the encoded output 506.

During each of the 4th 5th 6th 7th and 8th iterations of the scan, the ZR detector 320 detects that the current integer value is 0 to zero and, in response thereto, increments the counter 320 (so that N=5 by the end of the 8th iteration). During the 9th iteration of the scan, the ZR detector 320 detects that the current integer value is equal to 1 and, in response thereto, outputs an input value 306 equal to 4 (representing N−1) while driving the control signal 307 to the second state. Thereafter, the ZR detector 320 may reset the counter 322 (to N=0). The ZRC encoder 330 encodes the input value 306 as the EGR codeword "001000" and appends the ZR prefix ("1") to the EGR codeword responsive to the control signal 307 being driven to the second state. As a result, "0010001" is the fourth codeword associated with the encoded output 506.

The ZR detector 320 further outputs an input value 306 equal to 1 (representing the current non-zero integer value) while driving the control signal 307 to the first state. The ZRC encoder 330 encodes the input value 306 as the EGR codeword "10" but does not add the ZR prefix since the control signal 307 is in the first state. As a result, "10" is the fifth codeword associated with the encoded output 506. During the 10th iteration of the scan, the ZR detector 320 detects that the current integer value is equal to 1. Because the current count value N is equal to zero, the ZR detector 320 outputs an integer value 306 equal to 1 (representing the current non-zero integer value) while driving the control signal 307 to the first state. The ZRC encoder 330 encodes the input value 306 as the EGR codeword "10" but does not add the ZR prefix since the control signal 307 is in the first state. As a result, "10" is the sixth codeword associated with the encoded output 506.

During the 11th iteration of the scan, the ZR detector 320 detects that the current integer value is equal to 1. Because the current count value N is still equal to zero, the ZR detector 320 outputs an integer value 306 equal to 1 while driving the control signal 307 to the first state. The ZRC encoder 330 encodes the input value 306 as the EGR codeword "10" but does not add the ZR prefix since the control signal 307 is in the first state. As a result, "10" is the seventh codeword associated with the encoded output 506. During the 12th iteration of the scan, the ZR detector 320 detects that the current integer value is equal to 2. Because the current count value N is still equal to zero, the ZR detector 320 outputs an integer value 306 equal to 2 while driving the control signal 307 to the first state. The ZRC encoder 330 encodes the input value 306 as the EGR codeword "0010" but does not add the ZR prefix since the control signal 307 is in the first state. As a result, "0010" is the eighth codeword associated with the encoded output 506.

During each of the $13^{th}$ through $24^{th}$ iterations of the scan, the ZR detector 320 detects that the current integer value is 0 to zero and, in response thereto, increments the counter 320 (so that N=12 by the end of the $24^{th}$ iteration). However, because all 24 integer values associated with the integer sequence 504 have been scanned upon completion of the $24^{th}$ iteration of the scan, the ZR detector 320 does not output a subsequent input value 306. Rather, the ZR detector 320 may drive the control signal 307 to the third state (indicating that all integer values in the integer sequence have been scanned). The ZRC encoder 330 outputs the stop code "111" responsive to the control signal 307 being driven to the third state. As a result, "111" is the ninth and final codeword associated with the encoded output 506.

Figure 6:
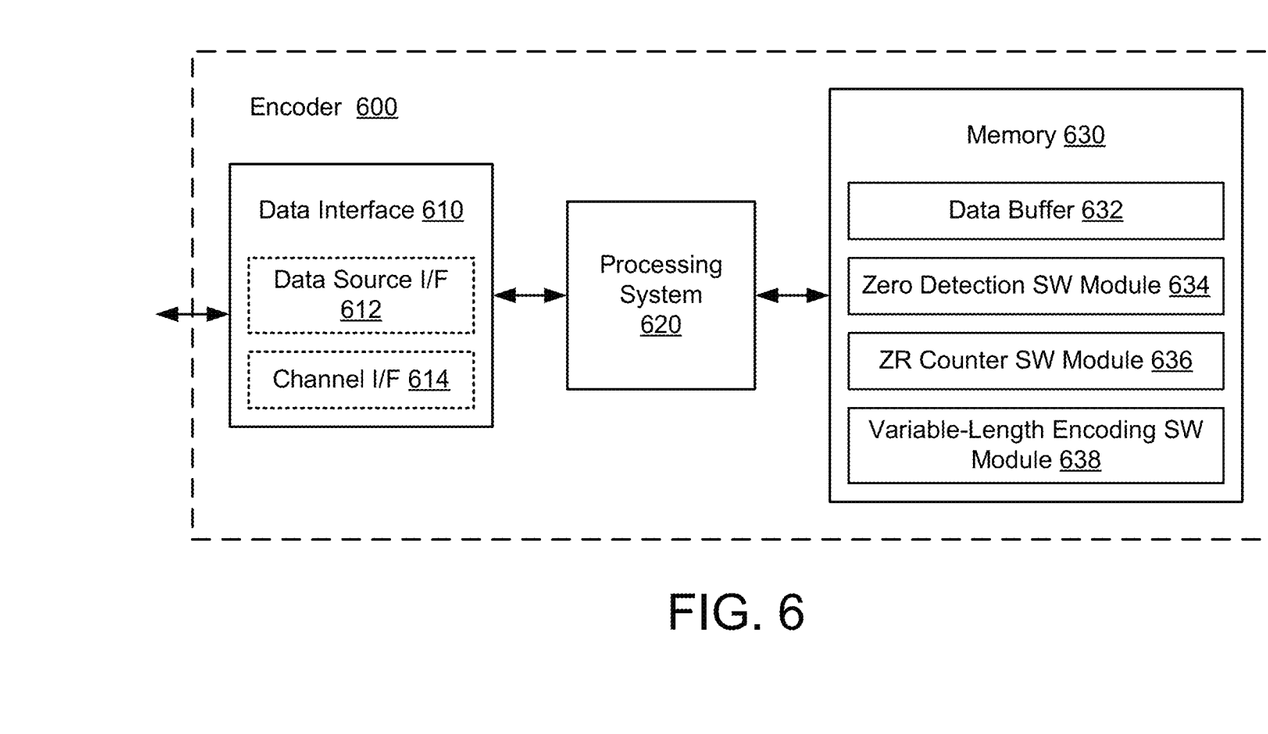
FIG. 6 shows a block diagram of an encoder, according to some implementations.

FIG. 6 shows a block diagram of an encoder 600, according to some implementations. In some implementations, the encoder 600 may be one example of any of the encoders 110, 210, or 300 of FIGS. 1, 2, and 3, respectively. More specifically, the encoder 600 may be configured to encode data symbols using entropy encoding techniques with run-length encoding of zeroes.

In some implementations, the encoder 600 may include a data interface 610, a processing system 620, and a memory 630. The data interface 610 is configured to receive the data symbols and output encoded codewords associated with the data symbols. In some aspects, the data interface 610 may include a data source interface (I/F) 612 and a channel interface 614. The data source interface 612 is configured to communicate with a data source coupled to or otherwise associated with the encoder 600. In some implementations, the data source interface 612 may obtain a number (M) of integer values representing a frame of data. The channel interface 614 is configured to communicate over a channel coupled between the encoder 600 and a decoder (not shown for simplicity).

The memory 630 may include a data buffer 632 configured to store the received data symbols and any intermediate data associated with the encoding operation. The memory 630 also may include a non-transitory computer-readable medium (including one or more nonvolatile memory elements, such as EPROM, EEPROM, Flash memory, a hard drive, and the like) that may store at least the following software (SW) modules:

- a zero detection SW module 634 to perform a zero-detection operation that scans the M integer values over M iterations, respectively, and indicate, during each of the M iterations, whether the scanned integer value is equal to zero;
- a ZR counter SW module 636 to increment a count value (N) responsive to the zero-detection operation indicating that the scanned integer value is equal to zero; and
- a variable-length encoding SW module 638 to output a first pattern of bits responsive to the zero-detection operation indicating that the scanned integer value is not equal to zero, where the first pattern of bits represents one of the count value N or the scanned integer value based on whether N is greater than zero.

Each software module includes instructions that, when executed by the processing system 620, causes the encoder 600 to perform the corresponding functions.

The processing system 620 may include any suitable one or more processors capable of executing scripts or instructions of one or more software programs stored in the encoder 600 (such as in memory 630). For example, the processing system 620 may execute the zero detection SW module 634 to perform a zero-detection operation that scans the M integer values over M iterations, respectively, and indicate, during each of the M iterations, whether the scanned integer value is equal to zero. The processing system 620 also may execute the ZR counter SW module 636 to increment a count value (N) responsive to the zero-detection operation indicating that the scanned integer value is equal to zero. Further, the processing system 620 may execute the variable-length encoding SW module 638 to output a first pattern of bits responsive to the zero-detection operation indicating that the scanned integer value is not equal to zero, where the first pattern of bits represents one of the count value N or the scanned integer value based on whether N is greater than zero.

Figure 7:
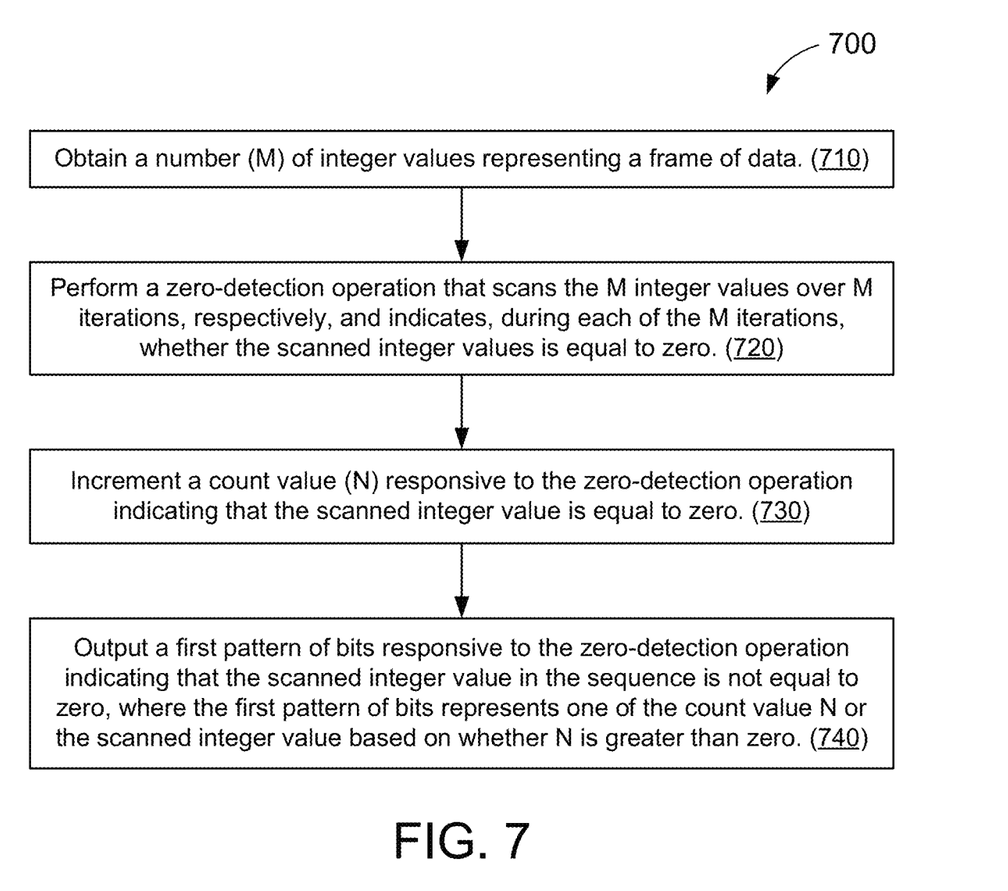
FIG. 7 shows an illustrative flowchart depicting an example operation for data encoding, according to some implementations.

FIG. 7 shows an illustrative flowchart depicting an example operation 700 for data encoding, according to some implementations. In some implementations, the example operation 700 may be performed by an encoder such as any of the encoders 110, 210, 300 or 600 of FIGS. 1, 2, 3, and 6 respectively.

The encoder may obtain a number (M) of integer values representing a frame of data (710). The encoder may perform a zero-detection operation that scans the M integer values over M iterations, respectively, and indicates, during each of the M iterations, whether the scanned integer values is equal to zero (720). The encoder also may increment a count value (N) responsive to the zero-detection operation indicating that the scanned integer value is equal to zero (730). The encoder may further output a first pattern of bits responsive to the zero-detection operation indicating that the scanned integer value in the sequence is not equal to zero, where the first pattern of bits represents one of the count value N or the scanned integer value based on whether N is greater than zero (740).

In some aspects, the obtaining of the M integer values may include receiving a sequence of data symbols and mapping each data symbol in the sequence to a respective integer value of the M integer values. In some implementations, each of the M integer values may be a non-negative value.

In some aspects, the outputting of the first pattern of bits may include determining that N is not greater than zero and encoding the scanned integer value as the first pattern of bits responsive to determining that the count value N is not greater than zero. In some implementations, the first pattern of bits may be an exponential Golomb-Rice codeword representing the scanned integer value.

In some aspects, the outputting of the first pattern of bits may include determining that N is greater than zero and encoding N−1 as an exponential Golomb-Rice codeword responsive to determining that the count value is greater than zero. In some implementations, the first pattern of bits may include a zero-run prefix followed by the exponential Golomb-Rice codeword. In some implementations, the zero-run prefix may be a single bit having a different binary value than the LSB of the first pattern of bits. In some implementations, the encoder may further encode the scanned integer value as a second pattern of bits, output the second pattern of bits following the first pattern of bits, and reset the count value to N=0.

In some aspects, the encoder may further output a stop code responsive to completing the $M^{th}$ iteration of the zero-detection operation. In some implementations, the stop code may include three consecutive bits each having a different binary value than the LSB of the first pattern of bits.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of data encoding, comprising:
    obtaining a number (M) of integer values representing a frame of data;
    performing a zero-detection operation that scans the M integer values over M iterations, respectively, and indicates, during each of the M iterations, whether the scanned integer value is equal to zero;
    incrementing a count value (N) responsive to the zero-detection operation indicating that the scanned integer value is equal to zero;

determining whether the count value N is greater than zero responsive to the zero-detection operation indicating that the scanned integer value is not equal to zero;

outputting a first pattern of bits, including an exponential Golomb-Rice (EGR) codeword, based on whether the count value N is determined to be greater than zero, the outputting of the first pattern of bits including:

determining a zero-run prefix based at least in part on the least significant bit (LSB) of the first pattern of bits so that the zero-run prefix has a different binary value than the LSB of the patter bits, the zero-run prefix indicating whether the EGR codeword represents a number of consecutive zeroes;

encoding the scanned integer value as the EGR codeword and refraining from including the zero-run prefix in the first pattern of bits responsive to determining that the count value N is not greater than zero; and encoding N−1 as the EGR codeword and including the zero-run prefix in the first pattern of bits responsive to determining that the count value N is greater than zero; and outputting one or more consecutive bits representing a stop code responsive to completing the Mth iteration of the zero-detection operation, each of the one or more consecutive bits each having a different binary value than the LSB of the first pattern of bits.

2. The method of claim 1, wherein the obtaining of the M integer values comprises:

receiving a sequence of data symbols; and mapping each data symbol in the sequence to a respective integer value of the M integer values.

3. The method of claim 2, wherein each of the M integer values is a non-negative value.

4. The method of claim 1, wherein the zero-run prefix is followed by the EGR codeword in the first pattern of bits.

5. The method of claim 4, wherein the zero-run prefix is a single bit.

6. The method of claim 1, further comprising:

encoding the scanned integer value as a second pattern of bits;

outputting the second pattern of bits following the first pattern of bits; and resetting the count value to N=0.

7. The method of claim 1, wherein the stop code comprises three consecutive bits.

8. An encoder comprising:

a processing system; and a memory storing instructions that, when executed by the processing system, causes the encoder to:

obtain a number (M) of integer values representing a frame of data;

perform a zero-detection operation that scans the M integer values over M iterations, respectively, and indicates, during each of the M iterations, whether the scanned integer value is equal to zero;

increment a count value (N) responsive to the zero-detection operation indicating that the scanned integer value is equal to zero;

determine whether the count value N is greater than zero responsive to the zero-detection operation indicating that the scanned integer value is not equal to zero; and output a first pattern of bits, including an exponential Golomb-Rice (EGR) codeword, based on whether N is greater than zero, the outputting of the first pattern of bits including:

determining a zero-run prefix based at least in part on the least significant bit (LSB) of the first pattern of bits so that the zero-run prefix has a different binary value than the LSB of the first pattern of bits, the zero-run prefix indicating whether the EGR codeword represents a number of consecutive zeroes;

encoding the scanned integer value as the EGR codeword and refraining from including the zero-run prefix in the first pattern of bits responsive to determining that the count value N is not greater than zero;

and encoding N−1 as the EGR codeword and including the zero-run prefix in the first pattern of bits responsive to determining that the count value is greater than zero; and output one or more consecutive bits representing a stop code responsive to completing the Mth iteration of the zero-detection operation, each of the one or more consecutive bits each having a different binary value than the LSB of the first pattern of bits.

9. The encoder of claim 8, wherein the obtaining of the M integer values comprises:

receiving a sequence of data symbols; and mapping each data symbol in the sequence to a respective integer value of the M integer values.

10. The encoder of claim 8, wherein the zero-run prefix is a single bit.

11. The encoder of claim 8, wherein execution of the instructions further causes the encoder to:

encode the scanned integer value as a second pattern of bits;

output the second pattern of bits following the first pattern of bits; and reset the count value to N=0.

12. The encoder of claim 8, wherein the stop code comprises three consecutive bits.

* * * * *

UNITED STATES PATENT AND TRADEMARK OFFICE
CERTIFICATE OF CORRECTION

PATENT NO. : 12,407,836 B2
APPLICATION NO. : 17/667017
DATED : September 2, 2025
INVENTOR(S) : Karol Trojanowski, Scott Liam Ransom and Timothy John Borer Page 1 of 1

It is certified that error appears in the above-identified patent and that said Letters Patent is hereby corrected as shown below:

In the Claims

Column 15, Line 11, "the LSB of the patter bits," should read "the LSB of the first pattern of bits,"

Column 16, Line 9, "zero; and" should read "zero;"

Signed and Sealed this
Thirtieth Day of September, 2025

John A. Squires
*Director of the United States Patent and Trademark Office*